Figure 1:
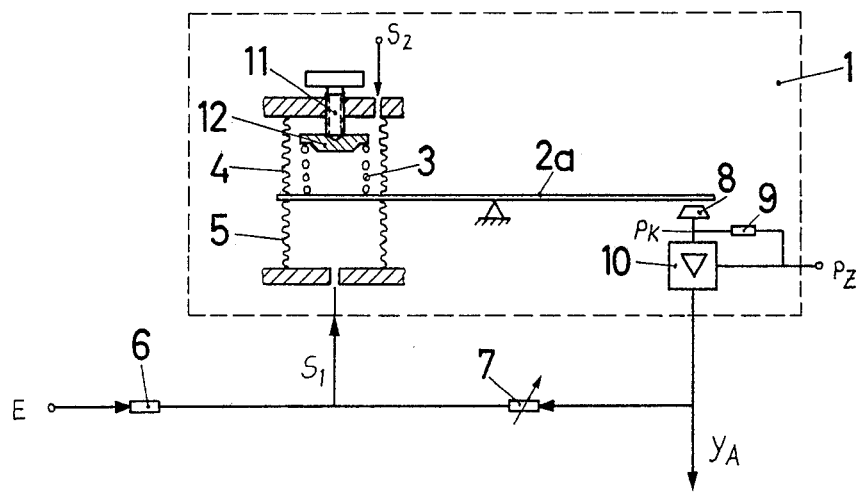

United States Patent [19]
Bader

[11] 3,877,477
[45]*Apr. 15, 1975

[54] PNEUMATIC TWO-POSITION CONTROLLER

[75] Inventor: Horst Bader, Stuttgart-Fasanenhof, Germany

[73] Assignee: J. C. Eckardt AG, Stuttgart, Germany

[ * ] Notice: The portion of the term of this patent subsequent to Aug. 14, 1990, has been disclaimed.

[22] Filed: Aug. 13, 1971

[21] Appl. No.: 171,634

[30] Foreign Application Priority Data
Aug. 13, 1970 Germany.............................. 2040170

[52] U.S. Cl..................................... 137/82; 137/85
[51] Int. Cl. ............................................ G05d 16/00
[58] Field of Search ...... 137/82, 84, 85; 235/200 R, 235/200 WB, 201 ME

[56] References Cited
UNITED STATES PATENTS

| | | | |
|---|---|---|---|
| 2,973,772 | 3/1961 | Oglesby | 137/82 |
| 3,104,810 | 9/1963 | Lupfer | 137/86 X |
| 3,266,380 | 8/1966 | Elge | 137/84 X |
| 3,455,319 | 7/1969 | Hogel | 137/85 |
| 3,752,193 | 8/1973 | Bader | 235/201 ME |

Primary Examiner—Alan Cohan
Assistant Examiner—Gerald A. Michalsky
Attorney, Agent, or Firm—Craig & Antonelli

[57] ABSTRACT

A fluid-pressure operated two-position controller in which an actuator for regulating the pressure from a source to provide an output pressure is displaced in response to the differential pressure in a pair of pressure chambers having elastic walls connected to the actuator, and further including an adjustable spring member capable of applying a selectively variable bias to said actuator to render the switching points of the controller adjustable.

7 Claims, 3 Drawing Figures

3,877,477

PATENTED APR 15 1975

INVENTOR

HORST BADER

BY Craig, Antonelli & Hill
ATTORNEYS

PNEUMATIC TWO-POSITION CONTROLLER

This invention relates to a pneumatic two-position controller, the set points or switching limits of which are adjustable.

Two-position controllers serve for limiting the fluctuations of a controlled variable to a range of values defined by specific upper and lower limit values. The value of the output (manipulated variable) of the two-position controller assumes only two conditions; for this reason, this type of controller is also called an "open-closed" or an "on-off" controller. The output of the controller switches from one condition to the other once the controlled variable applied to the input of the controller exceeds or drops below one of the two limit values.

Conventional control devices of this type start with a measuring unit (manometer) controlled by the controlled variable. This control process is transmitted to a control flapper actuating two mechanical switches or pneumatic scanning devices. Thus, in a conventional arrangement, the control flapper interrupts the air stream or jet between the discharge nozzle and the collecting nozzle and triggers the switching processes. The spacing of the scanning devices determines the switching levels of this two-position controller.

The known pneumatic systems occupy a relatively large amount of space and require a large expenditure from a manufacturing viewpoint. Thus, the problem to be solved by this invention resides in providing a pneumatic two-position controller in a space- and cost-saving arrangement, offering a large amount of operational safety with a small number of simple structural components.

This problem is solved, in accordance with this invention, by providing a differential pressure amplifier having a comparison and adjustment device for this amplifier in the form of a control flapper or a pair of displaceable balls, the spring and/or the elastic wall of the differential amplifier under the load of the control pressure $S_2$ being effective on the one side of a control flapper, for example, and the elastic wall exposed to the control pressure $S_1$ being effective on the other side of the control flapper. The control pressure $S_1$ is derived from a pressure divider or distributor to one input throttle of which the input pressure E of the controller is applied, and to the other input throttle of which the output pressure $y_A$ of the differential pressure amplifier is applied.

The invention includes a differential pressure amplifier which associates at least one output pressure with a pressure difference $S_1 - S_2$. According to this invention, the provision is made to adjust the control pressure $S_2$ to a constant value. This value applies to the comparison unit of the amplifier a comparison force, the magnitude of which determines the position of the switching points. It is technically equivalent to produce this comparison force by means of a spring, the bias of which is adjustable. The invention provides both possibilities. With respect to apparatus considerations, a spring is less complicated, but a control pressure signal $S_2$ makes it possible to adjust the set points more rapidly and accurately via a compressed air line. The control pressure $S_1$ is always derived from a pressure divider to which is applied the input pressure E and the output pressure $y_A$ of the amplifier. The relationship exists that, with increasing control pressure $S_1$, the output pressure $y_A$ increases:

$$y_A = V[S_1 - S_2]$$

The upper and the lower switching points of the two-position controller are adjustable independently of each other, if the bias of the spring or the control pressure $S_2$ and at least one throttle resistor of the pressure divider are adjustable.

The invention furthermore proposes to fashion the differential pressure amplifier in a conventional mode of construction. A rotatably mounted lever or control flapper on which the control pressures and/or the spring are effective serves as the comparison element and controls the air stream of a nozzle-baffle system.

The amount of required structural components is reduced if the differential pressure amplifier is constructed in accordance with my U.S. application Ser. No. 84,630 filed Oct. 28, 1970, now U.S. Pat. No. 3,682,199. In this amplifier, two balls serve as the control element in the comparison and adjustment unit. Two balls of the same diameter are displaceably arranged in a bore of constant diameter. In alignment with the contact point of the two balls, a supply duct for the compressed air terminates in the bore in a conventional manner. At least one outlet channel is provided in communication with the bore at a spacing of one-half the ball diameter from the supply duct.

Figure 2:
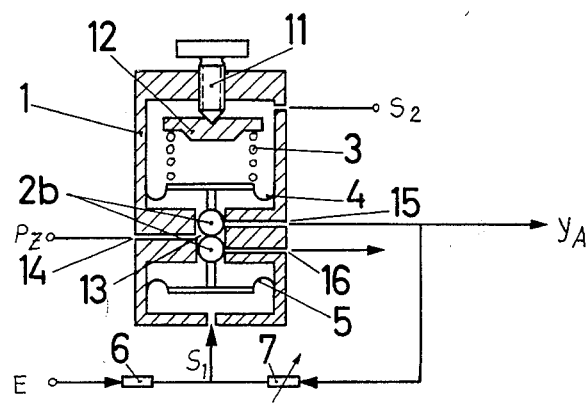

These and other objects, features and advantages of the present invention will become more apparent from the following detailed description thereof when taken with the accompanying drawings, wherein:

FIG. 1 shows an embodiment of the invention associated with a conventional structure of the differential pressure amplifier;

FIG. 2 shows an embodiment of the invention associated with a differential pressure amplifier according to my U.S. application U.S. Pat. No. 3,682,199.

Figure 3:
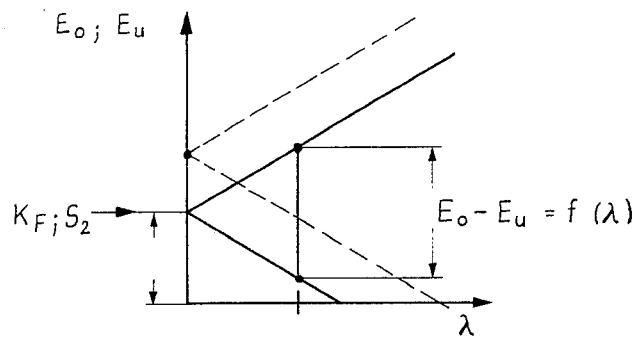

FIG. 3 illustrates a diagram explaining the adjustment of the switching points.

According to FIG. 1, the differential pressure amplifier 1 is composed of the pivotably supported lever 2a, the spring bellows 4 and 5 disposed on either side of the lever 2a at one end thereof, and the nozzle-baffle system containing the outlet nozzle 8 disposed adjacent the other free end of the lever 2a and the input throttle 9. The cascade pressure $p_K$ is fed to the amplifier 10 yielding the output pressure $y_A$ of the controller. The spring bellows 4 and 5 define the input pressure chambers of the amplifier 1. The spring 3 is disposed within the spring bellows 4; the bias of this spring is adjustable by means of the screw 11 via the spring plate 12.

A force proportional to the control pressure $S_2$ and/or the spring force of spring 3 are effective on one side of the lever 2a. A further force proportional to the control pressure $S_1$ is applied to the other side of the lever 2a with the aid of the spring bellows 5. The degree of deflection of the lever 2a is converted into the cascade pressure $p_K$ by the nozzle-baffle system 8, 9. The amplifier 10 amplifies this cascade pressure $p_K$ to produce the output pressure $y_A$ of the controller, which increases with increasing control pressure $S_1$. The throttle resistors 6 and 7 form a pressure divider from which the control pressure $S_1$ is derived. The input pressure E of the controller is applied to the resistor 6, and the output pressure $y_A$ is applied to the resistor 7.

Assuming that the flow Q of compressed air through a throttle resistor is proportional to the pressure difference present at this resistor, the following results for the control pressure $S_1$ according to the pressure divider equation:

$$S_1 = \frac{1}{1+\lambda} E + \frac{\lambda}{1+\lambda} y_A$$

Herein, the symbol $\lambda$ represents the ratio of the resistance values of the pressure divider resistors 6 and 7.

The mode of operation of the controller will be described for the case wherein the effective areas of the spring bellows 3 and 4 are of equal size and only the constant signal pressure $S_2$ is effective in the spring bellows 4. The spacing of the free end of the lever $2a$ (baffle plate) from the nozzle 8 is then determined only by the difference $S_1 - S_2$. The relationship $S_1 < S_2$ means that the spacing of the baffle plate to the outlet nozzle is very large. In this case, $y_A = 0$, and the following is valid:

$$S_1 = \frac{1}{1+\lambda} E ; \quad y_A = 0$$

The values $y_A$ and $E$ are operatively connected via the control system (not shown in FIG. 1) with the result that E increases in case $y_A = 0$ and E drops when $y_A$ assumes the maximum value $p_z$. The control pressure $S_1$ increases proportionally with E ($y_A = 0$). A force equilibrium occurs at the lever $2a$ when $S_1 = S_2 =$ constant. Then, $E = E_o = (1 + \lambda) S_2$. However, the assumption $y_A = 0$ does not apply any more, since, in the force equilibrium condition at the lever $2a$, the spacing of the baffle plate to the nozzle has decreased to such an extent that $y_A > 0$.

With increase in $y_A$, $S_1$ increases in turn, and with increase in $S_1$, $y_A$ again is increased. The case of equilibrium $S_1 = S_2$ is not retained; i.e., it is not a stable condition. Rather, the differential pressure amplifier 1 is modulated as soon as the equilibrium case has been attained. With $E = E_o = (1 + \lambda) S_2$, the upper set point $E_o$ is reached, effecting the switching over of the controller from $y_A = 0$ to $y_A = p_z$. After the switching step, E drops. The lower set point $E_u$ is reached when the equilibrium condition $S_1 = S_2$ occurs again with $y_A = p_z$. Then the following applies:

$$E = E_u = (1 + \lambda) S_2 - \lambda p_z$$

$$E_u = E_o - \lambda p_z$$

The upper switching point $E_o$ and the lower point $E_u$ are determined by the ratio $\lambda$ of the resistances of the pressure divider and by the control pressure $S_2 =$ constant. The effect of the control pressure $S_2$ can also be obtained by the force $K_F$ of the spring 3. The results $$E_o = (1 + \lambda) S_2$$

$$E_u = E_o - \lambda p_z$$

are illustrated graphically in FIG. 3 as functions of $\lambda$. For $\lambda = 0$, $E_o = E_u = S_2 = K_F$. $E_o$ increases with $\lambda$ and $E_u$ drops. The switching field, i.e. the spacing of the set points $E_o - E_u$ is determined solely by $\lambda$. The control pressure $S_2$ or the spring force $K_F$ determines the position of the switching hysteresis.

The embodiment of FIG. 2 starts with a differential pressure amplifier as suggested in my U.S. application Pat. No. 3,682,199. This results in a particularly simple and compact arrangement. The elastic walls 4 and 5 are in operative connection with the two balls $2b$ displaceably arranged in the bore 13. In alignment with the contact point of the balls, the supply duct 14 terminates in the bore 13. Respectively provided at a spacing of one-half the ball diameter from the supply duct 14, the discharge channels 15 and 16 are disposed in communication with the bore 13. From channel 15, the signal $y_A$ is derived and fed to the resistor 7 of the pressure divider. A further output signal can be derived from channel 16, which extends inversely proportional to $y_A$.

I claim:

1. A fluid-pressure operated two-position controller using a differential pressure amplifier operating with a source of supply pressure and providing an output pressure of first and second values in dependence upon a variable input pressure value reaching first and second set point values, comprising:
   first and second pressure chambers defined by elastic walls, said first chamber being supplied with a first control pressure of a predetermined value and said second chamber being supplied with a second control pressure,
   actuator means connected to the elastic walls of said first and second pressure chambers so as to be displaced in response to the differential pressure in said chambers for regulating the magnitude of said supply pressure to produce the output pressure of first and second values,
   spring means for biasing said actuator means in the same direction as one of said first and second pressure chambers, and
   pressure distributor means for providing said second pressure including a pair of fluid throttle resistors connected in series between an input pressure source providing an input pressure of variable value and said output pressure, said second pressure being derived from a point between said pair of fluid throttle resistors.

2. A fluid-pressure operated two-position controller as defined in claim 1 wherein said spring means includes an adjustable spring member capable of applying a selectively adjustable bias to said actuator means.

3. A fluid-pressure operated two-position controller as defined in claim 2 wherein at least one of said pair of fluid throttle resistors is adjustable.

4. A fluid-pressure operated two-position controller as defined in claim 3 wherein said actuator means includes a pivotably mounted lever having one end connected to said elastic walls of said first and second pressure chambers so as to be displaced thereby in respectively opposite directions, baffle means including a pressure amplifier and a nozzle connected to the input of said amplifier and receiving a pressure from said source of supply pressure, the free end of said lever being disposed adjacent said nozzle so as to vary the pressure from said source of supply pressure, the output of said amplifier serving as said output pressure.

5. A fluid-pressure operated two-position controller as defined in claim 1 wherein said actuator means includes first and second balls of equal diameter displaceably arranged in the bore of a housing, said balls being operatively connected to the elastic wall of a respective one of said first and second pressure chambers so as to be displaced by movement thereof, said housing being provided with a pair of output bores spaced by the diameter of the balls and in alignment therewith so as to be valved by said balls, and an input bore in said housing providing said source pressure to said balls for application to said output bores in a controlled manner.

6. A fluid-pressure operated two-position controller as defined in claim 5 wherein said spring means includes an adjustable spring member capable of applying a selectively adjustable bias to said actuator means.

7. A fluid-pressure operated two-position controller as defined in claim 6 wherein at least one of said pair of fluid throttle resistors is adjustable.

* * * * *